(12) United States Patent
Hayek et al.

(10) Patent No.: US 7,067,147 B2
(45) Date of Patent: Jun. 27, 2006

(54) HYPOALLERGENIC DIETARY COMPANION ANIMAL COMPOSITION CONTAINING HYDROLYZED POULTRY PROTEIN

(75) Inventors: Michael G. Hayek, Dayton, OH (US); Gregory D. Sunvold, Eaton, OH (US); Gregory A. Reinhart, Dayton, OH (US)

(73) Assignee: The Iams Company, Dayton, OH (US)

( * ) Notice: Subject to any disclaimer, the term of this patent is extended or adjusted under 35 U.S.C. 154(b) by 0 days.

(21) Appl. No.: 09/566,437

(22) Filed: May 8, 2000

(65) Prior Publication Data

US 2003/0072786 A1    Apr. 17, 2003

(51) Int. Cl.
*A23K 1/17* (2006.01)
*A61K 47/00* (2006.01)
*A23J 1/02* (2006.01)
*A23J 1/04* (2006.01)
*A23L 2/05* (2006.01)

(52) U.S. Cl. .................... 424/442; 424/439; 426/657; 426/656; 426/641; 426/658; 426/661

(58) Field of Classification Search ............... 426/656, 426/658, 641, 657, 549, 2, 69, 72, 74, 635, 426/646, 805; 424/442, 439
See application file for complete search history.

(56) References Cited

U.S. PATENT DOCUMENTS

| | | | |
|---|---|---|---|
| 4,025,650 A | 5/1977 | Gans et al. | |
| 4,053,589 A | 10/1977 | Gans et al. | |
| 4,800,093 A * | 1/1989 | Hogan et al. | ................. 426/46 |
| 4,954,361 A | 9/1990 | Girsh | |
| 5,009,867 A * | 4/1991 | Kratochvil | .................. 426/128 |
| 5,064,674 A | 11/1991 | Girsh | |
| 5,126,332 A * | 6/1992 | Ohta et al. | ..................... 514/54 |
| 5,567,424 A * | 10/1996 | Hastings | .................. 424/195.1 |
| 5,603,945 A * | 2/1997 | Isobe et al. | ................. 424/442 |
| 5,620,737 A | 4/1997 | Kazemzadeh | |
| 5,654,028 A | 8/1997 | Christensen et al. | |
| 5,968,896 A * | 10/1999 | Bell et al. | ....................... 514/2 |
| 6,077,558 A * | 6/2000 | Euber | ........................ 426/601 |

FOREIGN PATENT DOCUMENTS

| | | |
|---|---|---|
| JP | 08149954 | 6/1996 |
| JP | 09047230 | 2/1997 |
| SU | 1 683 641 | 10/1991 |
| WO | WO 95 21540 A | 8/1995 |
| WO | WO 98/39980 | 9/1998 |
| WO | WO 99 20122 A | 4/1999 |

OTHER PUBLICATIONS

Hormel Foods Online: URL:<http://www.hormel.com/templates/knowledge/knowledge.asp?id=516&catitemid=29&hlite=true&querytext=liver> pp. 1-3.*

Techni-Cal Senior For Dogs: URL <http://webarchive.org/http://www.uspto.gov/web/offices/pac/dapp/opla/preognotice/moreinfoamdprac.htm/19990427211609/www.techni-cal.com/prosenior.html; Dec. 1998 pp. 1-4.*

(Continued)

*Primary Examiner*—Patricia Leith
(74) *Attorney, Agent, or Firm*—Cynthia L. Clay; Kelly L. McDow-Dunham; Karen F. Clark

(57) ABSTRACT

A hypoallergenic dietary composition is provided for companion animals such as dogs and cats which contains a source of hydrolyzed protein, a source of fat, and a source of carbohydrates. The composition preferably further includes a fiber source. The dietary composition may also be administered to companion animals as a method of managing and/or diagnosing food allergies.

11 Claims, 2 Drawing Sheets

OTHER PUBLICATIONS

Groh, M. et al., Diagnosis of food allergy in the non-seasonally symptomatic dog using a novel antigen, low molecular weight diet: a prospective study of 29 cases; Journal of Veterinary Allergy and Clinical Immunology 1998; 6(1): 5-6.

Guilford, W.G., New ideas for the dietary management of gastrointestinal tract disease; Journal of Small Animal Practice 1994; 35(12): 620-.

Restani, P et al., Evaluation by SDS-PAGE and immunoblotting of residual antigenicity in hydrolysed protein formulas; Clin Exp Allergy Jul. 1995: 25(7): 651-8.

Sampson, H.A., Food allergy; AMA Dec. 10, 1997; 278(22): 1888-94.

Exl, B.M. et al., Role of hydrolyzed formulas in nutritional allergy prevention in infants; South Med J Dec. 1997; 90(12): 1170-5.

* cited by examiner

HYPOALLERGENIC DIETARY COMPANION ANIMAL COMPOSITION CONTAINING HYDROLYZED POULTRY PROTEIN

BACKGROUND OF THE INVENTION

This invention relates to a dietary composition for diagnosing and managing food allergies in companion animals such as dogs and cats, and more particularly, to a hypoallergenic dietary composition which utilizes hydrolyzed protein as the sole protein source.

An ongoing challenge in the veterinary community has been the diagnosis and management of food allergies in companion animals such as dogs and cats. Food allergies often result in dermal and gastrointestinal disease in dogs, which can develop food hypersensitivities from the age of 2 months to over 12 years. Other symptoms associated with food allergies in dogs include chronic diarrhea, malabsorption of nutrients, weight loss, abdominal pain, and lethargy.

The major food allergens are water-soluble glycoproteins with molecular weights ranging from 10,000 to 60,000 daltons. The primary causes of food hypersensitivity in dogs are dairy products, beef, and plant proteins, while cats predominately develop food hypersensitivities to fish and dairy products.

Diagnosis of food allergies in animals has included procedures such as intradermal skin testing with food allergens or serological testing such as radioallergossorbent (RAST) or enzyme linked immunoassays (ELISA). However, such methods have been found to be unreliable. Currently, diagnosis of food allergies typically requires placing the animal on a home cooked elimination diet that tends to be time-consuming and inconvenient. For example, the animal must be maintained on the elimination diet for periods ranging from 3 to 10 weeks.

A common treatment for food hypersensitivity is strict avoidance. However, avoidance may be difficult to achieve in companion animals as home cooked diets are inconvenient to prepare, protein sources such as lamb may be difficult to purchase, and commercial diets may have hidden antigens. In addition, prolonged feeding of one or more new sources of protein may result in the development of hypersensitivity to that protein. Although corticosteroids may reduce clinical signs, chronic use may have long-term detrimental effects on dogs and cats.

It has been found that the allergenic properties of proteins can be reduced by enzymatic hydrolysis of proteins into peptides. Studies have suggested that diets formulated with hydrolyzed protein will decrease the antigenic load and reduce allergic reactions in food allergy models. Partially hydrolyzed diets have been used for high-risk infants and in the prevention of clinical signs of food hypersensitivity in dogs and cats. The majority of these diets utilize hydrolyzed dairy products (casein) or plant proteins (soy protein). However, such studies do not indicate the extent of hydrolysis required to prevent an allergic reaction in animals. Nor do the previous studies indicate appropriate protein sources for use in the diets of companion animals.

Another factor which must be taken into consideration in developing a hypoallergenic diet for companion animals is to include a fiber source which results in acceptable stool formation while avoiding any potential allergies. For example, beet pulp is a commonly used fiber source in animals foods containing proteins which may have the potential to cause an allergic reaction.

Accordingly, there is still a need in the art for a dietary composition for companion animals such as dogs and cats which allows the diagnosis and management of food allergies in such animals while providing acceptable stool formation.

SUMMARY OF THE INVENTION

The present invention meets that need by providing a hypoallergenic dietary composition for companion animals such as cats and dogs which may be used for the diagnosis and management of food allergies. The dietary composition includes a hydrolyzed protein as the sole source of protein in the diet to reduce antigen production and allergic reactions along with a fiber source which provides acceptable stool formation.

In accordance with one aspect of the present invention, a hypoallergenic dietary composition for companion animals is provided comprising, on a dry matter basis, a source of protein, a source of fat, and a source of carbohydrates, where the source of protein comprises from about 20 to 30% by weight on a dry matter basis of a hydrolyzed protein. The hydrolyzed protein preferably comprises hydrolyzed chicken liver. Preferably, at least 99% of the protein has a molecular weight of less than 1.5 kDa.

The carbohydrate source is preferably cassava, which comprises from about 50 to 60% by weight on a dry matter basis of the composition.

The composition preferably further comprises from about 1 to 5% by weight on a dry matter basis of a fiber source selected from the group consisting of apple fiber, pea fiber, a blend of carboxymethylcellulose (CMC) and resistant starch, and mixtures thereof.

When the composition of the present invention is administered to companion animals in a quantity and frequency appropriate for their nutritional needs, it has been found that the animals exhibit reduced antigen production. The composition of the present invention may also be used to provide a method of diagnosing food allergy in a companion animal. For example, an animal experiencing allergic symptoms may be placed on the diet of the present invention for several weeks, and if the symptoms are alleviated, the presence of a food allergy is confirmed and the animal may then be fed various protein sources to determine the specific source of the allergy.

Accordingly, it is a feature of the present invention to provide a hypoallergenic dietary composition and method for diagnosing food allergies in companion animals. Other features and advantages of the invention will be apparent from the following description, the accompanying drawings, and the appended claims.

DETAILED DESCRIPTION OF THE PREFERRED EMBODIMENT

Figure 1:
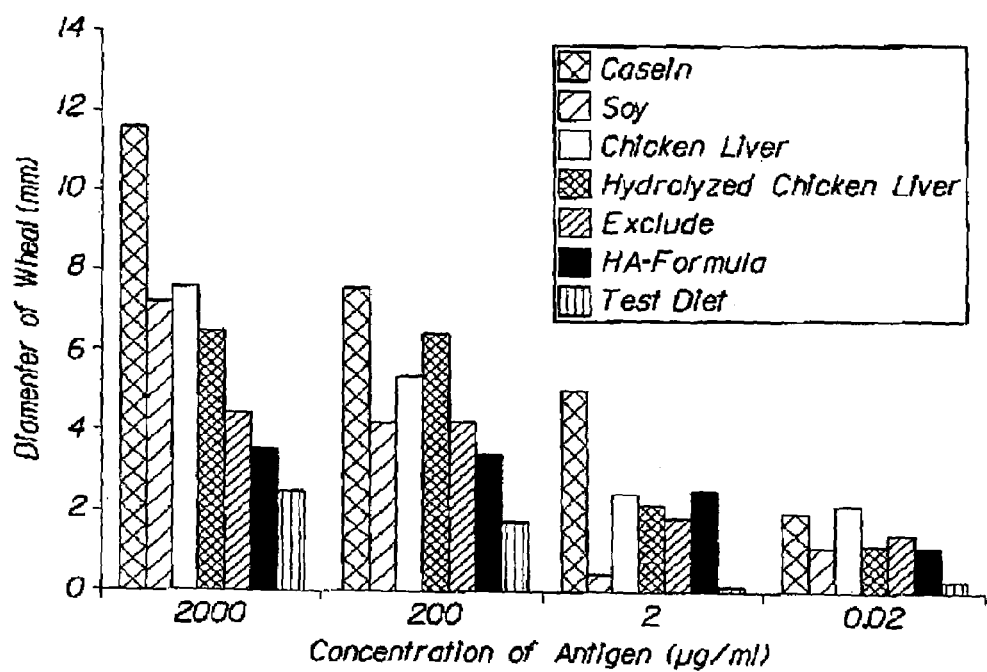
FIG. 1 is a bar graph showing the dermal reactions of dogs fed various hydrolyzed diets including the hypoallergenic diet of the present invention.

The hypoallergenic dietary composition of the present invention provides an improvement over currently available dietary compositions in that the composition uses hydrolyzed protein as the sole protein source, which provides an effective method for diagnosing food allergies in companion animals. Further, the composition includes a fiber source which does not induce further potential for an allergic reaction and which provides acceptable stool formation.

We have found that the dietary composition of the present invention reduces antigen production in the animal, and performs as well or better than other commercially available hypoallergenic diets with regard to the demonstration of a reaction or the degree of reaction.

The dietary composition may be provided in any suitable form as long as it contains the preferred concentration of hydrolyzed protein on a dry matter basis. For example, the composition may be extruded and canned or provided in biscuit form.

The composition preferably comprises from about 9% to 30% by weight fat, 50 to 60% by weight carbohydrates, and from about 20 to 30% by weight of the hydrolyzed protein source, all on a dry matter basis. In addition, the composition preferably includes from about 1 to 5% by weight of a fiber source selected from apple fiber, pea fiber, a blend of carboxymethylcellulose and resistant starch, and mixtures thereof.

The source of hydrolyzed protein in the composition preferably comprises hydrolyzed chicken liver. The composition is preferably formulated so that at least 99% of the protein source has a molecular weight of less than 1.5 kDa to ensure that hydrolysis has occurred to the extent that an allergic reaction will be prevented.

The source of carbohydrates preferably comprises cassava, but may also include other sources such as potato flour, oats, and barley.

The source of fat preferably comprises animal fat, but may also include poultry fat, fish oil, flax oil, and borage oil.

In order that the invention may be more readily understood, reference is made to the following examples which are intended to illustrate the invention, but not limit the scope thereof.

EXAMPLE 1

A diet was formulated for canines which utilized hydrolyzed chicken liver as the protein source and cassava as a carbohydrate source. The diet was formulated with 99.8% of the protein having a molecular weight below 1.4 kiloDaltons (kDa) as shown below in Table 1.

TABLE 1

Molecular weight distribution of hydrolyzed poultry liver. All data are presented as percentage (%) of total protein found within each molecular weight range.[a]

| Protein Molecular Weight Ranges | Sample 1 | Sample 2 |
|---|---|---|
| >250 kDa | <0.001 | <0.001 |
| 148–250 kDa | <0.001 | <0.001 |
| 60–148 kDa | <0.001 | <0.001 |
| 42–60 kDa | <0.001 | <0.001 |
| 30–42 kDa | <0.001 | <0.001 |
| 22–30 kDa | <0.001 | <0.001 |
| 17–22 kDa | <0.001 | <0.001 |
| 6–17 kDa | <0.001 | <0.001 |
| 4–6 kDa | <0.001 | <0.001 |
| 2.5–4 kDa | <0.001 | <0.001 |
| 1.4–2.5 kDa | <0.001 | <0.001 |
| <1.4 kDa | >99.8 | >99.8 |

[a]Sample 1 contained 65.75% crude protein and sample 2 contained 65.76% crude protein.

The composition of the diet is presented in Table 2.

TABLE 2

Hydrolyzed protein diet. No fiber diet.

| Ingredient | Percent |
|---|---|
| Cassava | 59.493 |
| Hydrolyzed Poultry Liver | 28.164 |
| Animal Fat | 6.328 |
| Dicalcium Phosphate | 1.881 |
| Calcium Carbonate | 0.998 |
| Potassium Chloride | 0.741 |
| DL-methionine | 0.599 |
| Sodium Chloride | 0.513 |
| Choline chloride | 0.456 |
| Vitamin Premix | 0.399 |
| Mineral Premix | 0.371 |
| Monosodium phosphate | 0.057 |

A palatability study was initiated and stool production was checked. By day 3 of the palatability study, stool scores ranged in the 3's and 2's with reports of black mucous formation (see Table 3 below). Using this scoring system, an ideal stool would have a score of 4.

TABLE 3

Stool scores from palatability test.[a]

| Dog | Day 1 Stool Scores[b] | Day 2 Stool Score[b] | Day 3 Stool Score[b] |
|---|---|---|---|
| Joshua | n/s[c] | 2,3 | 2,3,3 |
| Christopher | n/s | 2,3 | 2/3 |
| Max | n/s | 4 | 2, 2/3 |
| Sleepy | n/s | 2 | 3 |
| Pumpkin | n/s | 4 | 2 |
| Millie | n/s | 4 | 2 |
| Tomahawk | n/s | 0 | 4 |
| Sonic | n/s | 4 | 3,4 |
| Stubs | n/s | 4 | 3/2 |
| Sunshine | n/s | 0 | 3/2 |

[a]Comments: 80% of the stools appeared very black. Mucous evident in stools.
[b]Stool Scores: 0 = puddle, no formed stool; 1 = watery, liquid that can be formed; 2 = soft, unformed, pudding-like; 3 = soft, formed, moist, retains shape; 4 = hard, formed, dry stool, remains firm and soft 5 = hard, dry pellet, small hard mass.
[c]n/s = no stool From the initial palatability study, it was determined that a fiber source needed to be identified having moderate fermentability in the gastrointestinal tract of the dog but which would not cause an allergic reaction, and which would result in acceptable stool formation. Fiber sources meeting this criteria were apple fiber, pea fiber and a combination of CMC/resistant starch. These fibers were incorporated into diets (see Table 4) and were tested for stool production in a bioassay. A total of 12 dogs were utilized for this bioassay (4 dogs per treatment). Dogs were fed their respective diets for 21 days and fecal scores were recorded daily. The results are summarized in Table 5. The diet formulated with Apple Pomace resulted in the best-formed stools.

TABLE 4

Hydrolyzed protein diet. Fiber options.

| Ingredient | Apple Pomace Test Diet | Pea Fiber Test Diet | CMC/ Novelose ™* Test Diet |
|---|---|---|---|
| Cassava | 56.483 | 55.945 | 58.193 |
| Hydrolyzed Poultry Liver | 26.218 | 26.319 | 26.560 |
| Animal Fat | 7.182 | 7.699 | 7.638 |
| Apple Pomace | 3.990 | — | — |
| Pea Fiber | — | 3.992 | — |
| Dicalcium Phosphate | 1.966 | 1.939 | 1.938 |
| Novelose | — | — | 0.997 |
| Calcium Carbonate | 0.969 | 0.912 | 0.969 |
| Potassium Chloride | 0.769 | 0.770 | 0.769 |
| DL-methionine | 0.598 | 0.599 | 0.598 |
| CMC | — | — | 0.513 |
| Sodium Chloride | 0.513 | 0.513 | 0.513 |
| Choline Chloride | 0.456 | 0.456 | 0.456 |
| Drydog Vitamin premix | 0.399 | 0.399 | 0.399 |
| Drydog mineral premix | 0.370 | 0.371 | 0.370 |
| Monosodium phosphate | 0.085 | 0.086 | 0.085 |

*resistant starch, commercially available from National Starch and Chemical Company, Inc.

TABLE 5

Stool Scores from Fiber Option Bioassay.

| Treatment[a] | Average Stool Score[b] |
|---|---|
| Apple Pomace | 3.93 |
| Pea Fiber | 3.32 |
| CMC/Novelose | 3.39 |

[a]Reports of mucous formation in the stool. Apple Pomace = 1; Pea Fiber = 6; CMC/Novelose = 5
[b]Stool Scores: 1 = watery, liquid that can be formed; 2 = soft, unformed, pudding-like; 3 = soft, formed, moist, retains shape; 4 = hard, formed, dry stool, remains firm and soft 5 = hard, dry pellet, small hard mass.

EXAMPLE 2

The diet of Example 1 was tested to determine its efficacy. The diet utilized is presented in Table 6 below.

TABLE 6

Hydrolyzed protein diet

| Ingredient | Percentage |
|---|---|
| Cassava | 56.483 |
| Hydrolyzed Poultry Liver | 26.218 |
| Animal Fat | 7.182 |
| Apple Pomace | 3.990 |
| Dicalcium Phosphate | 1.966 |
| Calcium Carbonate | 0.969 |
| Potassium Chloride | 0.769 |
| DL-methionine | 0.598 |
| Sodium Chloride | 0.513 |
| Choline Chloride | 0.456 |
| Vitamin premix | 0.399 |
| Mineral premix | 0.370 |
| Monosodium phosphate | 0.085 |

The diet was tested in dogs that were experimentally induced to be allergic to poultry liver, casein, and soy protein. The diet was tested along with Exclude® (DVM Pharmaceuticals) and HA-Formula™ (Ralston Purina) hypoallergenic compositions. The protocol and results are summarized below.

Protocol. The studies were carried out in accordance with the NIH *Guide for the Care and Use of Laboratory Animals* and The Canadian Council on Animal *Care Guide for the Care and Use of Experimental Animals*. Crossbred sled dogs (n=14) were used for this study and animals were obtained from 3 litters. Animals were randomly allocated to 2 treatment groups within 24 hours of birth. Group 1 dogs (n=11) were sensitized to casein, chicken liver, and soy protein and Group 2 dogs (n=3) acted as controls and were not sensitized to any food antigens.

Dogs were placed on a puppy diet (The Iams Company, Dayton, Ohio) for the first 6 months and then maintained on an adult diet (The Iams Company, Dayton, Ohio) for the remainder of the study. These diets did not contain milk protein, soy protein, or chicken liver. Dogs were provided diets containing milk protein, soy protein, and chicken liver for 4 weeks at 11 months of age. Food was provided according to manufacturers' recommendations and fresh water was provided ad libitum. Animals were observed daily and any clinical abnormalities were recorded.

Food antigens/analysis. Sensitizing antigens included casein, soy protein, and chicken liver (1:1:1, based on weight). Hypersensitivity reactions were performed on the following hydrolyzed and intact diets: casein (Sigma), 1% hydrolyzed casein (Iams), 2% hydrolyzed casein (Iams), 5% hydrolyzed casein (Iams), 10% hydrolyzed casein (Iams), 20% hydrolyzed casein (Iams), 50% hydrolyzed casein (Iams), chicken liver, hydrolyzed chicken liver (Iams), soy protein, Exclude® (hydrolyzed casein and liver, 16.5% protein, DVM Pharmaceuticals, Miami, Fla.), HA-Formula™ (hydrolyzed soy, 18% protein, Ralston Purina, St. Louis, Mo.), and a hydrolyzed chicken liver diet (test diet; 19% protein, The Iams Company, Lewisburg, Ohio). Casein and chicken liver hydrolysis was performed by the Iams Company (Lewisburg, Ohio). The degree of hydrolysis, expressed as a percent, represents the proportion of the hydrolysis reaction to free amino acids.

In order to determine the molecular weights of the proteins within the test diets and sensitizing antigens, SDS-PAGE electrophoresis was performed. Each antigen was prepared by making a 10% wt./wt. suspension or solution using distilled water and shaking vigorously for 1 hour. Protein concentration was determined using the BioRad assay system (BioRad, Missisauga Ontario). Solutions were adjusted to contain 2 mg/ml protein. SDS-PAGE electrophoresis was performed on a 20% separating gel and 4% stacking gel at 200V for 5.5 hours. Ten micrograms of protein was loaded on each lane of the gel.

The SDS-PAGE gels separated proteins between 5 and 80 kDa. The detectable maximum and minimum molecular weight from each sample is provided in Table 7.

TABLE 7

Molecular weight range of proteins in SDS Page Gels

| Antigen Source | Source | Molecular weight range |
|---|---|---|
| Casein | Sigma Chemicals | 5 > 50 kDa |
| 1% hydrolyzed casein | Iams Company | 5 > 50 kDa |
| 2% hydrolyzed casein | Iams Company | 5 > 50 kDa |
| 5% hydrolyzed casein | Iams Company | 5 > 50 kDa |
| 10% hydrolyzed casein | Iams Company | 5 < 14.2 kDa |
| 20% hydrolyzed casein | Iams Company | 5 < 14.2 kDa |
| 50% hydrolyzed casein | Iams Company | <5 kDa |
| Chicken liver | Fresh chicken liver | 5 > 50 kDa |
| Hydrolyzed chicken liver | Iams Company | 5 > 50 kDa |
| Soy Protein | Sigma Chemicals | 5 > 50 kDa |

TABLE 7-continued

Molecular weight range of proteins in SDS Page Gels

| Antigen Source | Source | Molecular weight range |
| --- | --- | --- |
| HA Formula ™ | Ralston Purina | 5 < 20 kDa |
| Exclude ® | DVM Pharmaceuticals | 5 < 30 kDa |
| Hydrolyzed chicken liver test diet | Iams Company | 5 < 30 kDa |

Minimal hydrolysis of high molecular weight proteins were produced in the 1%, 2% and 5% hydrolyzed casein samples. These hydrolyzed samples did not significantly differ from casein alone. Significant hydrolysis of high molecular weight proteins was achieved in the 10 and 20% samples, but there was still evidence of some high molecular weight proteins. Specific casein proteins such as α-lactalbumin (14.2 kDa) could be identified in the 1–10% hydrolyzed casein samples. Complete hydrolysis of high molecular weight proteins appears to have been achieved in the 50% hydrolyzed casein sample. Nonhydrolyzed casein had an abundance of high molecular weight proteins. Both the chicken liver and hydrolyzed chicken liver have high molecular weight bands. Significant hydrolysis of proteins was achieved in the Exclude, HA-Formula, and test diets, but weak high molecular weight bands could still be identified.

Sensitization protocol. The sensitization protocol for the Group 1 dogs involved the subcutaneous injection of puppies with a live viral vaccine (distemper, hepatitis, parvovirus, parainfluenza, Fort Dodge Ayerst, Guelph Ontario) followed by the subcutaneous injection of a food antigen in alum adjuvant 10. Between day 1 and day 85, Group 1 dogs were sensitized by 7 injections of 1 mg of casein, soy protein, and chicken liver. Control animals received only adjuvant.

Skin tests. Skin tests were performed after the dogs completed the sensitization protocol to the sensitizing antigens at approximately 6 months of age. Dermal hypersensitivity to the test diets (casein, 1% hydrolyzed casein, 2% hydrolyzed casein, 5% hydrolyzed casein, 10% hydrolyzed casein, 20% hydrolyzed casein, 50% hydrolyzed casein, chicken liver, hydrolyzed chicken liver, soy protein, Exclude, HA-Formula, test diet) were conducted at approximately 10 months of age. The ventral aspect of the abdomen was used for skin testing of each puppy. Four concentrations of food allergen (2,000, 200, 20 and 0.02 μg/ml) were injected intradermally (0.05 ml). Histamine at the same concentration as the antigens was used as a positive control while sterile saline was used as the negative control. Evans blue dye (0.5%, 0.2 ml/kg) was administered intraveneously 5–10 minutes after the intradermal injections. Approximately 20 minutes after the intradermal injections, the diameter of the wheal and flare reaction of each allergen was measured.

Gastroscopic food sensitivity. Gastroscopic examinations were performed on puppies when they were approximately 6 months of age (following sensitization) and 10 months (test diets). Dogs were anesthetized with 2–3% halothane after acepromazine sedation. Endoscopy was performed with a pediatric upper GI endoscope with a working channel for injections. Test antigens (same as skin tests, 0.5 ml, 1 mg/ml in 1:1 saline/glycerin) were injected into the gastric mucosa using a sclerotherapy needle. The control consisted of saline/glycerin. Evans blue dye (0.5%, 0.2 ml/kg) was administered IV 5–10 minutes before the gastric injections. Gastric mucosal responses to each antigen and control were evaluated 5 minutes after injection according to the degree of swelling, erythema, and blue patching using the following grading system: 0=normal gastric mucosa; 1=slight erythema; 2=slight erythema and edema; 3=moderate erythema and edema; slight blue patching; 4=severe erythema and edema; blue patching.

Serum IgE. Serum was collected from control and sensitized dogs at the end of the sensitization protocol (6 months of age). The concentration of specific IgE serum antibodies was determined using ELISA in a commercial diagnostic laboratory (Biomedical Services, Austin, Tex.). The serum IgE titer was compared to a large pool of normal dogs and dogs with established food hypersensitivities. IgE levels were scored as normal, borderline, positive, and highly positive.

Sensitization of dogs. After dogs had undergone the sensitization protocol, skin sensitivity and gastric reactions to sensitizing antigens were measured at 6 months of age. It was determined that all dogs were successfully sensitized to the casein, soy flour and chicken liver antigens. Control animals were not sensitized.

Clinical Evaluation. When dogs were placed on diets consisting of soy, casein, and chicken liver at 11 months of age, all sensitized dogs developed moderate to several diarrhea and lost weight (data not shown). Furthermore, 8 of the 11 sensitized dogs demonstrated dermatological reactions that included hair loss and pruritis of the ventrum. No dermatological reactions were observed in the control dogs. Clinical signs developed within the first week of feeding the sensitizing diet and persisted as long as the diet was provided.

Dermal and gastroscopic reactions to test diets. The dermal reactions to 4 different concentrations of 14 different food antigens were determined in control and sensitized dogs. All dogs reacted to all concentrations of the positive control (histamine) and no dogs responded to the negative control (saline) stimulus. Control dogs (#1, #2, and #3) reacted to the antigens only at high doses. All sensitized dogs except dog 12 (no reaction to soy flour) reacted to the 3 sensitizing antigens. There was a dose-dependent degree of reaction with the highest antigen concentrations producing the most prominent reactions. The dermal reactions of 1% hydrolyzed casein, 2% hydrolyzed casein, 5% hydrolyzed casein, 10% hydrolyzed casein, and 20% hydrolyzed casein were not significantly different from casein alone and in fact many dogs reacted more severely to the hydrolysate than to the native protein (e.g., dogs 6, 11, 14). Fewer dogs reacted to 50% hydrolyzed casein than casein alone and the diameter of the flare reaction was less pronounced. At the lower test concentrations (2 mg/ml and 0.02 mg/ml), hydrolyzed casein and hydrolyzed chicken liver induced a smaller reaction in fewer animals than casein and chicken liver, respectively (FIG. 1). Exclude, Ha-Formula, and hydrolyzed chicken liver produced a similar reaction to hydrolyzed casein while the test diet was the least reactive (FIG. 1).

Figure 2:
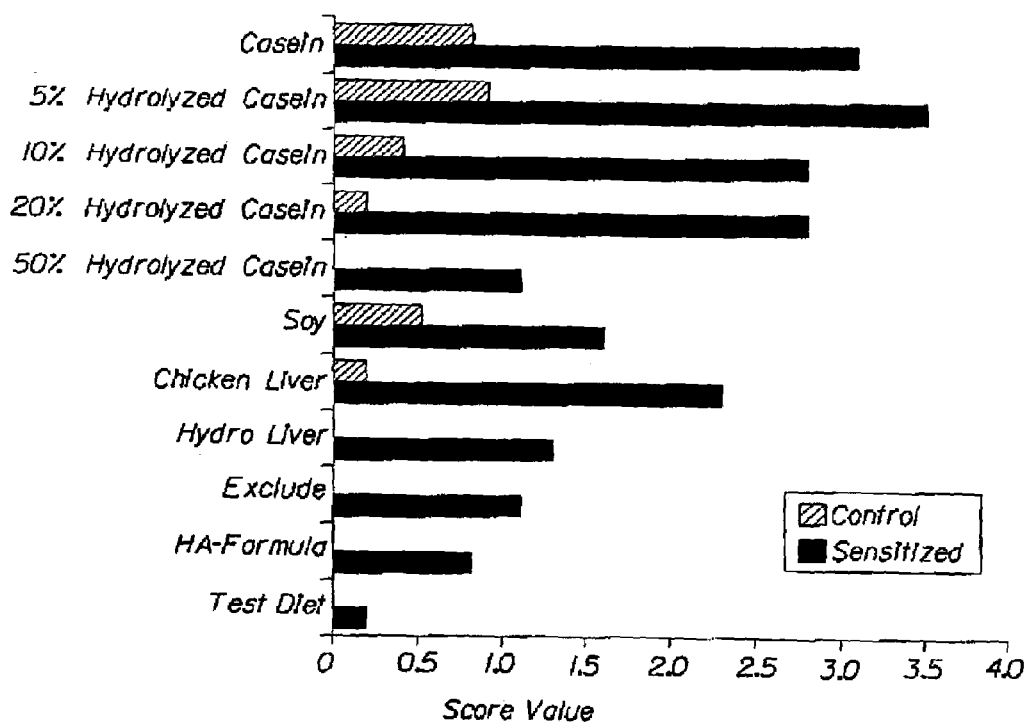
FIG. 2 is a bar graph showing the gastric mucosal responses of dogs fed the hydrolyzed diets shown in FIG. 1.

The patterns of the gastric mucosal reactions to the test diet antigens were similar to those seen following the dermal injections. In the sensitized dogs, only the 50% hydrolyzed casein, HA-Formula, Exclude, and test diet had gastroscopic scores significantly lower than the nonhydrolyzed antigens (FIG. 2). The test diet was the least reactive of all challenge antigens. The gastroscopic scores of the control dogs were normal or slight for all antigens (FIG. 2).

Results. The results from the study indicate that a high degree of protein hydrolysis (up to 50% of complete hydrolysis) is required to eliminate hypersensitivity reactions. A lesser degree of hydrolysis may enhance allergic reactions as the antigenic epitopes within the 3-dimensional structure of proteins are exposed to immunological processing.

Dogs did not respond to the commercial hypoallergenic hydrolyzed diets (Exclude or HA-Formula diet) which are milk/liver-based and soy-based formulas, respectively. The test diet provided the least dermal and mucosal reactions of the three sensitized diets.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A hypoallergenic composition comprising, on a dry matter basis, a source of protein, a source of fat, and a source of carbohydrates, said source of protein comprising from about 20 to 30% by weight of a hydrolyzed poultry protein; wherein the hypoallergenic composition is a companion animal composition; and wherein at least 99% of said hydrolyzed poultry protein has a molecular weight of less than 1.5 kDa.

2. A composition as claimed in claim 1 wherein said hydrolyzed poultry liver protein comprises hydrolyzed chicken liver protein.

3. A composition as claimed in claim 1 further comprising from about 1 to 5% by weight of a fiber source, by weight of said composition.

4. A composition as claimed in claim 3 wherein said fiber source is selected from the group consisting of apple fiber, pea fiber, a blend of carboxymethylcellulose and resistant starch, and mixtures thereof.

5. A composition as claimed in claim 1 comprising from about 50 to 60% carbohydrate source, by weight of said composition.

6. A composition as claimed in claim 1 wherein said carbohydrate source comprises cassava.

7. A composition as claimed in claim 1 wherein said hydrolyzed poultry protein comprises hydrolyzed poultry liver protein.

8. A hypoallergenic composition comprising, on a dry matter basis, a source of protein, a source of fat, a source of carbohydrates, and a fiber source selected from the group consisting of apple fiber, pea fiber, a blend of carboxymethylcellulose and resistant starch, and mixtures thereof, said source of protein comprising from about 20 to 30% by weight of a hydrolyzed chicken liver protein, and wherein 99% of the hydrolyzed chicken liver protein has a molecular weight of less than 1.5 kDa wherein the hypoallergenic composition is a companion animal composition.

9. A hypoallergenic composition comprising, on a dry matter basis, a source of fat, a source of carbohydrates, and a fiber source selected from the group consisting of apple fiber, pea fiber, a blend of carboxymethylcellulose and resistant starch, and mixtures thereof, said source of protein comprising from about 20 to 30% by weight of a hydrolyzed poultry protein; wherein the hypoallergenic composition is a companion animal composition and wherein at least 99% of said hydrolyzed poultry protein has a molecular weight of less than 1.5 kDa.

10. A composition as claimed in claim 9 wherein said hydrolyzed poultry protein comprises hydrolyzed poultry liver protein.

11. A composition as claimed in claim 10 wherein said hydrolyzed poultry liver protein comprises hydrolyzed chicken liver protein.

* * * * *